(12) United States Patent
Zipp et al.

(10) Patent No.: US 10,545,065 B2
(45) Date of Patent: Jan. 28, 2020

(54) TUBE DIAPHRAGM SEAL

(71) Applicant: WIKA Alexander Wiegand SE & Co. KG, Klingenberg (DE)

(72) Inventors: Joachim Zipp, Collenberg (DE); Tobias Hench, Buergstadt (DE); Udo Hoerning, Eichenbuehl (DE)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 179 days.

(21) Appl. No.: 15/784,519

(22) Filed: Oct. 16, 2017

(65) Prior Publication Data

US 2018/0106372 A1    Apr. 19, 2018

(30) Foreign Application Priority Data

Oct. 14, 2016 (DE) .................. 10 2016 012 275

(51) Int. Cl.
*G01L 19/06* (2006.01)
*G01F 23/00* (2006.01)
*G01K 1/08* (2006.01)
*G01L 19/00* (2006.01)

(52) U.S. Cl.
CPC .......... *G01L 19/0645* (2013.01); *G01F 23/00* (2013.01); *G01K 1/08* (2013.01); *G01L 19/0092* (2013.01)

(58) Field of Classification Search
CPC .................... G01L 19/0046; G01L 19/003
See application file for complete search history.

(56) References Cited

U.S. PATENT DOCUMENTS 8,297,359 B2 * 10/2012 McKay ................. E21B 33/076
166/339

FOREIGN PATENT DOCUMENTS

DE          19949831 A1      4/2001
JP           09218120 A  *   8/1997
JP         2002277339 A  *   9/2002

* cited by examiner

*Primary Examiner* — Clayton E. LaBalle
*Assistant Examiner* — Leon W Rhodes, Jr.
(74) *Attorney, Agent, or Firm* — Muncy, Geissler, Olds & Lowe, P.C.

(57) ABSTRACT

An adapter for a diaphragm seal, having a first coupling area for fluid-tight coupling with a process port, a second coupling area for fluid-tight coupling with a diaphragm seal and an adapter diaphragm, which is disposed fluid-tight at a junction between the first coupling area and the second coupling area and is designed to come into contact with a seal diaphragm in a mounted state of the diaphragm seal. A measuring system is also provided for measuring a pressure, a fill level and/or a temperature of a process medium within an apparatus, and an apparatus of this type.

18 Claims, 2 Drawing Sheets

TUBE DIAPHRAGM SEAL

This nonprovisional application claims priority under 35 U.S.C. § 119(a) to German Patent Application No. 10 2016 012 275.7, which was filed in Germany on Oct. 14, 2016, and which is herein incorporated by reference.

BACKGROUND OF THE INVENTION

Field of the Invention

The invention relates to an adapter for a diaphragm seal and to a measuring system and an apparatus.

Description of the Background Art

It is generally known from the prior art to ascertain a pressure, a temperature and a fill level of a process medium, i.e. a medium to be analyzed, within an apparatus, for example a switching apparatus. To avoid direct contact between a measuring instrument and the process medium, seals, for example diaphragm seals, are provided, which prevent the process medium from penetrating the measuring instrument.

A diaphragm seal of this type is known, for example from DE 199 49 831 A1, which is incorporated herein by reference. The diaphragm seal comprises a base body, a flat recess formed in the base body, which is surrounded by an annular joining surface, and a flat diaphragm unit, which is fastened fluid-tight to the joining surface of the base body by means of its edge area. The diaphragm unit, together with a base of the recess, delimits a fluid chamber, which is filled with a fill fluid during operation. The diaphragm unit includes a first diaphragm facing the fluid chamber and a second diaphragm. The two diaphragms have the same shape and are disposed in parallel to each other. An evacuated cavity is formed in the base body, which is in flow connection with an evacuated intermediate space formed between the two diaphragms, a detecting device being connected to the cavity, with the aid of which a state change in the cavity is detectable.

SUMMARY OF THE INVENTION

It is therefore an object of the invention to provide an adapter for a diaphragm seal, a measuring system which is improved compared to the prior art and an improved apparatus.

An exemplary adapter according to an embodiment of the invention for a diaphragm seal can include a first coupling area for fluid-tight coupling with a process port, a second coupling area for fluid-tight coupling with a diaphragm seal and an adapter diaphragm, which is disposed fluid-tight at a junction between the first coupling area and the second coupling area, and is designed for the purpose of coming into contact with a seal diaphragm in a mounted state of the diaphragm seal.

Due to the fluid-tight coupling with the process port, the adapter makes it possible to easily and cost-effectively remove the diaphragm seal and simultaneously seal off the process from the surroundings and thus avoid a contact with the surroundings, in particular a contact with the outside air. The implementation of a local calibration of a measuring system which includes the diaphragm seal is also permitted.

Due to the contact of the adapter diaphragm with the seal diaphragm in the mounted state of the diaphragm seal, a double diaphragm assembly is facilitated, which has a good pressure transmission behavior.

In an embodiment, the adapter diaphragm can have a corrugated cross section. The for example sinusoidal waves permit a low temperature error with little manufacturing complexity. Diaphragms of this type may be manufactured with nearly all diaphragm materials, thicknesses and diameters.

The measuring system according to an embodiment of the invention for measuring a pressure, a fill level and/or a temperature of a process medium within an apparatus comprises an adapter described above and a diaphragm seal, the diaphragm seal being coupled fluid-tight with the adapter in the second coupling area thereof.

Due to the fluid-tight coupling of the adapter with the process port, the measuring system makes it possible to easily and cost-effectively remove the diaphragm seal and simultaneously seal off the process from the surroundings and thus avoid a contact with the surroundings, in particular a contact with the outside air. A local calibration of the measuring system is furthermore made possible thereby.

Due to the contact of the adapter diaphragm with the seal diaphragm in the mounted state of the diaphragm seal, a double diaphragm assembly is facilitated, which has a good pressure transmission behavior.

In an embodiment of the measuring system, the diaphragm seal is coupled with at least one measuring instrument or component of a measuring instrument, a transmission channel being formed within the diaphragm seal, which is delimited by the seal diaphragm at its first end and by a detection area of the measuring instrument at its second end. This assembly facilitates an easy and reliable measured value detection.

To optimize a movement of the seal diaphragm and the adapter diaphragm in contact therewith, a movement space for the movement of the seal diaphragm is adjacent to a first end of the transmission channel, which faces the seal diaphragm.

The transmission channel and the movement space are filled, for example, with a diaphragm seal fluid, which facilitates a good transmission of movements to the measuring instrument generated by the diaphragms due to pressure changes.

According to an embodiment of the measuring system, the seal diaphragm and the adapter diaphragm have a congruent, corrugated cross section. Of course, all other shapes of cross sections of a diaphragm are also possible, for example stepped or triangular or freely profiled diaphragms. Due to the congruency, the pressure transmission behavior of the double diaphragm assembly is further improved.

In an embodiment of the measuring system, the adapter and/or the diaphragm seal have or has a vacuum port for evacuating an intermediate space formed between the adapter and the diaphragm seal in the mounted state. Due to this evacuation, it is possible to easily bring the adapter diaphragm and the seal diaphragm into full contact with each other.

To monitor the vacuum generated for evacuation, a measuring device is coupled, for example, with the vacuum port. The monitoring of the evacuation makes it possible to check a correctness of an operation of the measuring instrument and a possible "post-evacuation."

In an embodiment of the measuring system, a valve is coupled with the vacuum port. With the aid of this valve, it is possible, on the one hand, to carry out the evacuation and to seal the evacuated area. On the other hand, the valve makes it possible to easily stop the evacuation and vacuum associated therewith by opening the valve and thus removing the diaphragm seal.

According to an embodiment, the diaphragm seal and the adapter are designed to be essentially cylindrical, at least in sections, the cylindrical section of the diaphragm seal being delimited on one side by the seal diaphragm, and the cylindrical section of the adapter being delimited on one side by the adapter diaphragm, the diaphragm seal projecting into the cylindrical section of the adapter by its cylindrical section, seal diaphragm first. Due to this fit of the diaphragm seal in the adapter, it is possible to easily ensure that the adapter diaphragm and the seal diaphragm are disposed congruently one on top of the other prior to the evacuation.

To minimize or avoid a movement of the cylindrical diaphragm seal in the radial direction within the adapter, an outer diameter of the essentially cylindrical section of the diaphragm seal and an inner diameter of the essentially cylindrical section are designed in such a way that the diaphragm seal is movable within the adapter without any noticeable clearance. For example, the fit used is an "H7/g6" or "H7/h6" clearance fit according to DIN 7157 (DIN=German Institute for Standardization).

For a secure fastening of the diaphragm seal on the adapter, according to an embodiment of the measuring system, it is provided that the adapter has a female thread or a male thread, and the diaphragm seal has a male thread or female thread corresponding thereto; the adapter and the diaphragm seal includes fastening structures for fastening at least one clamp or a clamping ring and/or corresponding bores and/or threads for a screw connection.

In an embodiment of the measuring system, the adapter and/or the diaphragm seal have/has an outer diameter of 30 mm to 80 mm, 40 mm to 70 mm, in particular 45 mm or 55 mm. With these dimensions, the adapter diaphragm and the seal diaphragm, i.e. the double diaphragm assembly, have a particularly good transmission behavior. At the same time, these dimensions enable a relatively low working volume of the measuring system to be implemented, a reliable operation of the measuring system, including a particularly fast response behavior and a particularly good temperature sensitivity, being ensured due to the particularly good transmission behavior of the double diaphragm assembly and the low working volume.

The apparatus according to the invention comprises a process chamber, in which a process medium is present, a process port coupled with the process chamber and a measuring system according to the preceding description, which is coupled with the process port.

In an embodiment of the apparatus, the adapter diaphragm is disposed in an alignment with a wall delimiting the process chamber. In other words, the measuring system is mounted on the apparatus in such a way that the double diaphragm assembly and thus the adapter and the diaphragm seal are situated to be flush-mounted with the wall delimiting the process chamber. In particular, this achieves the fact that the process chamber is not impaired by the measuring system, whereby a reliable and very precise measured value detection results. At the same time, an easy cleaning of the process chamber may be ensured.

According to an embodiment of the apparatus, to securely fasten the measuring system to the apparatus, it is provided that the adapter has a female thread or a male thread, and the diaphragm seal has a male thread or female thread corresponding thereto, the process port has a female thread or a male thread, and the adapter has a male thread or female thread corresponding thereto, the adapter and the diaphragm seal, as well as the adapter and the process port, include fastening structures for fastening at least one clamp or a clamping ring and/or corresponding bores and/or threads for a screw connection.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
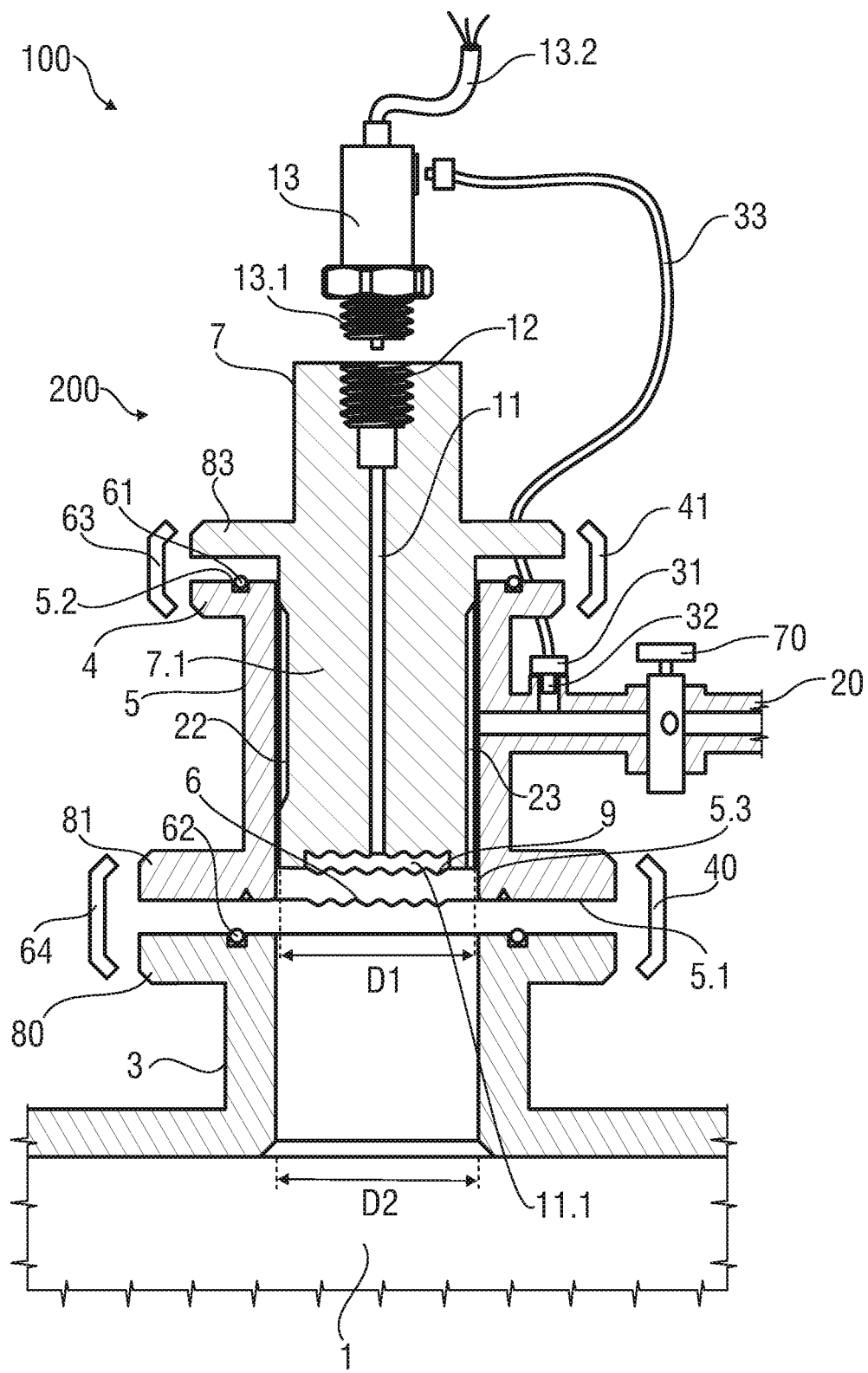
FIG. 1 schematically shows a sectional drawing of a detail of an apparatus, including an exemplary embodiment of a measuring system in an exploded view.

FIG. 1 shows a sectional drawing of a detail of an apparatus 100, including an exemplary embodiment of a measuring system 200 according to the invention in an exploded view.

Measuring system 200 is provided for detecting a pressure, a temperature and/or a fill level of a process medium, which is not illustrated, in a process chamber 1 of apparatus 100.

For this purpose, measuring system 200 includes a measuring instrument 13, a diaphragm seal 7 and an adapter 5, which is disposed between process port 3, which is connected to process chamber 1, and diaphragm seal 7.

Adapter 5 includes a first coupling area 5.1 for fluid-tight coupling with process port 3. A circumferential seal 62, in particular an O ring, is disposed on a surface of process port 3 facing this first coupling area 5.1 for sealing purposes.

In the illustrated exemplary embodiment, a fastening of adapter 5 on process port 3 takes place with the aid of a clamping closure, also referred to as a clamp connection or a clamp screw connection. For this purpose, both process port 3 and adapter 5 each have a flange as fastening structures 80, 81, which are tightly clamped together with the aid of a one-part or two-part clamp 40, 64 surrounding these components or in a manner, which is not illustrated, using a clamping ring.

Adapter 5 furthermore includes a second coupling area 5.2 for fluid-tight coupling with diaphragm seal 7, a circumferential seal 61, in particular an O ring, being disposed on a surface of second coupling area 5.2 facing diaphragm seal 7 for sealing purposes.

In addition, adapter 5 includes an adapter diaphragm 6, which is disposed fluid-tight at a junction between first coupling area 5.1 and second coupling area 5.2 and is designed to come into contact with a seal diaphragm 9 in a mounted state of diaphragm seal 7.

Diaphragm seal 7 and adapter 5 are designed to be essentially cylindrical, at least in sections, a cylindrical section 7.1 of diaphragm seal 7 being delimited on one side by seal diaphragm 9, and a cylindrical section 5.3 of adapter 5 being delimited on one side by adapter diaphragm 6. Diaphragm seal 7 projects into cylindrical section 5.3 of adapter 5 with its cylindrical section 7.1, seal diaphragm 9 first.

An outer diameter D1 of diaphragm seal 7 and an inner diameter D2 of adapter 5 are designed, in particular, in such a way that essentially cylindrical sections 7.1, 5.3 are movable at least without noticeable clearance. This means that diaphragm seal 7 is inserted into adapter 5 with a fit, at least in sections, without any noticeable clearance.

In the illustrated exemplary embodiment, a fastening of diaphragm seal 7 to adapter 5 takes place with the aid of a clamping closure, also referred to as a clamp connection or a clamp screw connection. For this purpose, both diaphragm seal 7 and adapter 5 each have a flange as fastening structures 83, 4, which are tightly clamped together with the aid of a one-part or two-part clamp 41, 63 surrounding these components or in a manner, which is not illustrated, using a clamping ring.

To produce the contact of adapter diaphragm 6 on seal diaphragm 9, an evacuation of an intermediate space formed between adapter 5 and diaphragm seal 7 is carried out in the mounted state. Adapter 5 has a vacuum port 20 for the purpose of this evacuation.

A sensor 32 for detecting a pressure within vacuum port 20 is coupled on vacuum port 20 with the aid of a screw connection 31, which is coupled with measuring instrument 13 via a data line 33 for monitoring the vacuum.

A valve 70 is furthermore coupled with vacuum port 20.

Recesses 22, 23 are introduced on the outer circumference of diaphragm seal 7 for generating the vacuum on adapter diaphragm 6 and seal diaphragm 9, recess 23 being led as a groove up to the area of adapter diaphragm 6 and seal diaphragm 9.

To generate the vacuum, valve 70 is opened and the intermediate space between adapter 5 and diaphragm seal 7 is evacuated. For this purpose, adapter diaphragm 6 comes into contact with seal diaphragm 9, both diaphragms having a congruent, corrugated cross section.

Due to the contact of adapter diaphragm 6 with seal diaphragm 9, a double diaphragm assembly is created, which has a good pressure transmission behavior. To transmit the pressure of the process medium in process chamber 1 to measuring instrument 13, which is coupled with diaphragm seal 7 with the aid of a male thread 13.1 on a measuring port 12 designed as a corresponding female thread, a transmission channel 11 is formed between the double diaphragm assembly and measuring instrument 13 within diaphragm seal 7, which is filled, in particular, with a diaphragm seal fluid, which is not illustrated. On a lower end of transmission channel 11 facing the double diaphragm assembly, this channel opens into a movement space 11.1 for the movement of the double diaphragm assembly and thus seal diaphragm 9.

As a function of the pressure of the process medium prevailing within process chamber 1, the double diaphragm assembly moves due to the contact of adapter diaphragm 6 with seal diaphragm 9, the diaphragm seal fluid present in transmission channel 11 and movement channel 11.1 transmitting these movements to measuring instrument 13.

In the illustrated exemplary embodiment, measuring instrument 13 includes a data line 13.2 for transmitting measured data to an evaluating system and/or a display unit. Alternatively, the evaluation and display functions may be an integral part of measuring instrument 13.

To remove diaphragm seal 7, for example, for the purpose of local calibration or replacement, the vacuum is first compensated for by opening valve 70 and/or by opening screw connection 31. Diaphragm seal 7 may then be removed from adapter 5 by opening clamps 41, 63. Adapter 5 continues to remain fastened to process port 3 fluid-tight and thus seals off process chamber 1 from its surroundings and thus protects it against contact with the surroundings, in particular contact with the outside air.

Measuring instrument 13, which is mounted on the corresponding female thread of measuring port 12 with the aid of male thread 13.1, may, of course, also be connected to the diaphragm seal by means of welding or fitting on or with the aid of gluing. The connection may furthermore be implemented by means of a capillary.

Figure 2:
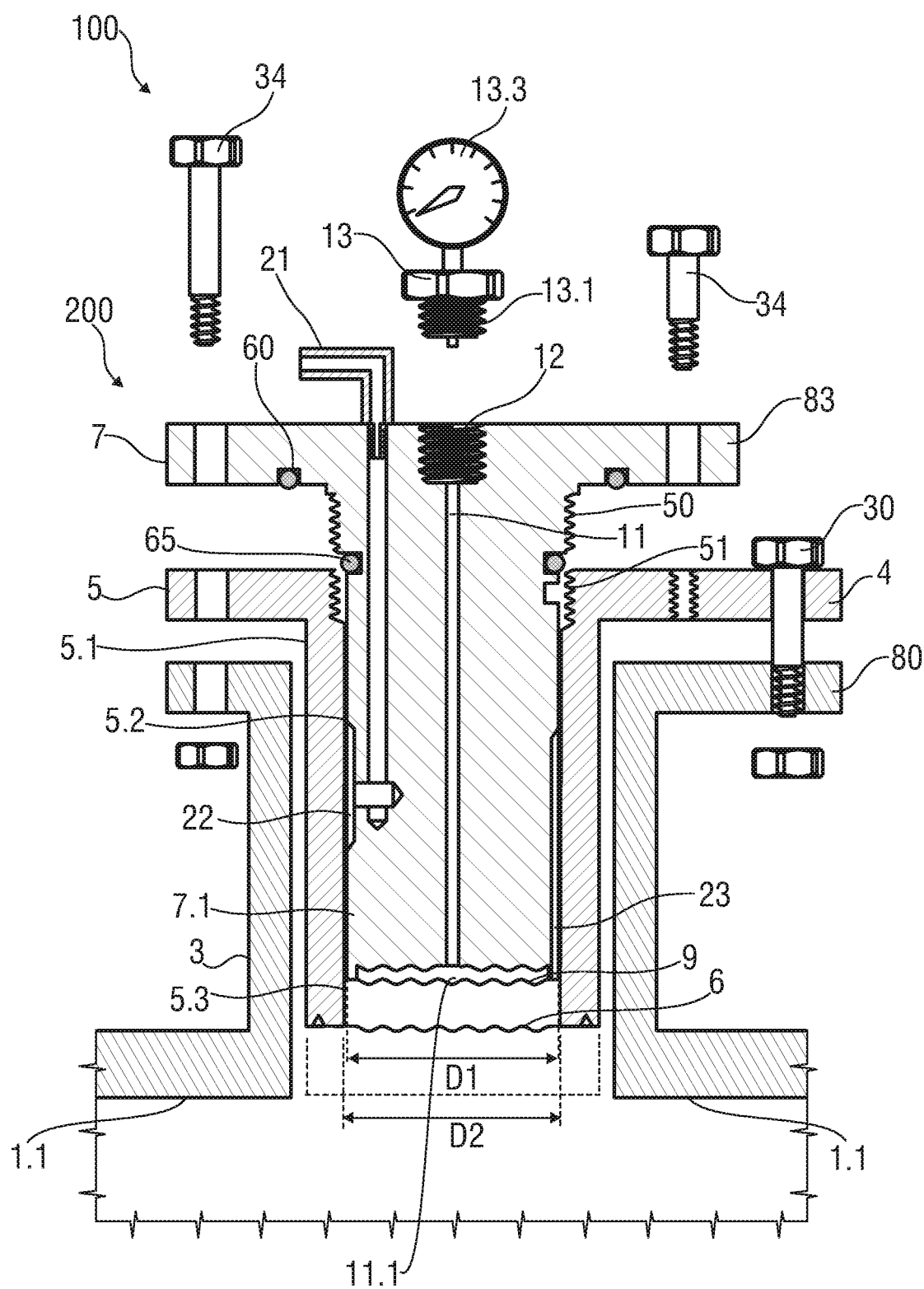
FIG. 2 schematically shows a sectional drawing of a detail of an apparatus, including an exemplary embodiment of a measuring system in an exploded view.

FIG. 2 shows a sectional drawing of a detail of an apparatus 100, including an exemplary embodiment of measuring system 200 according to the invention in an exploded view.

In contrast to the exemplary embodiment of measuring system 200 illustrated in FIG. 1, this embodiment includes a measuring instrument 13 designed as a manometer, which includes a display unit 13.3 for displaying the measured values.

The second exemplary embodiment of measuring system 200 further differs from the first exemplary embodiment, in that process port 3, adapter 5 and diaphragm seal 7 are designed in such a way that adapter diaphragm 6 or the double diaphragm assembly is disposed in an alignment with a wall 1.1 delimiting the process chamber. In other words, measuring system 200 is mounted on apparatus 100 in such a way that the double diaphragm assembly and thus adapter 5 and diaphragm seal 7 are situated to be flush-mounted with wall 1.1 delimiting process chamber 1.

Another difference is that a vacuum port 21 is part of diaphragm seal 7. Vacuum port 21 may also be coupled with a sensor 32 in a manner which is not illustrated in greater detail for detecting the pressure within vacuum port 21, which is coupled with measuring instrument 13 or with another measuring instrument via a data line 33 for monitoring the vacuum. A valve 70 may furthermore be coupled with vacuum port 21.

Another difference is that adapter 5 has a female thread 51, and diaphragm seal 7 has a male thread 50 corresponding thereto for fastening diaphragm seal 7 on adapter 5. Two seals 60, 65 designed as O rings are disposed on diaphragm seal 7 for sealing diaphragm seal 7 on adapter 5.

To fasten diaphragm seal 7 on adapter 5 and to fasten adapter 5 on the process port, diaphragm seal 7, adapter 5 and process port 3 each have fastening structures 83, 4, 80 designed as flanges, into which corresponding bores and threads are introduced for the purpose of producing screw connections 30, 34.

To remove diaphragm seal 7, for example for the purpose of local calibration or replacement, the vacuum is first compensated for by opening valve 70, which is not illustrated. Diaphragm seal 7 may then be removed from adapter 5 by opening clamp connections 34. Adapter 5 continues to remain fastened to process port 3 with the aid of screw connection 30 and thus seals off process chamber 1 from its surroundings and thus protects it against contact with the surroundings, in particular contact with the outside air.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An adapter for a diaphragm seal comprising:
a first coupling area for fluid-tight coupling with a process port;
a second coupling area for fluid-tight coupling with a diaphragm seal; and
an adapter diaphragm disposed fluid-tight at a junction between the first coupling area and the second coupling area, the adapter diaphragm being adapted to come into contact with a seal diaphragm of the diaphragm seal in a mounted state of the diaphragm seal,
wherein the adapter is substantially cylindrical, at least in sections, and wherein a cylindrical section of the adapter has a vacuum port integrally attached to a side surface thereof.

2. The adapter according to claim 1, wherein the adapter diaphragm has a corrugated cross section.

3. The adapter according to claim 1, wherein the adapter is provided with an upper flange and a lower flange, the adapter diaphragm being in alignment with an outer wall of the lower flange.

4. The adaptor according to claim 1, wherein when a valve of the vacuum port is in an open position, the adapter diaphragm directly contacts the seal diaphragm.

5. A measuring system for measuring a pressure, a fill level and/or a temperature of a process medium within an apparatus, the measuring system comprising:
an adapter; and
a diaphragm seal,
wherein the adapter includes a first coupling area for fluid-tight coupling with a process port, a second coupling area for fluid-tight coupling with the diaphragm seal and an adapter diaphragm disposed fluid-tight at a junction between the first coupling area and the second coupling area, the adapter diaphragm contacting a seal diaphragm of the diaphragm seal in a mounted state of the diaphragm seal,
wherein the diaphragm seal is coupled fluid-tight with the adapter in the second coupling area thereof, and
wherein the diaphragm seal and the adapter are substantially cylindrical, at least in sections, wherein a cylindrical section of the diaphragm seal is delimited at a first end by the seal diaphragm, wherein a cylindrical section of the adapter is delimited at a first end by the adapter diaphragm, and wherein the cylindrical section of the diaphragm seal projects into the cylindrical section of the adapter.

6. The measuring system according to claim 5, wherein the diaphragm seal is coupled with at least one measuring instrument or is part of a measuring instrument, and wherein a transmission channel is formed within the diaphragm seal, which is delimited by the seal diaphragm at the first end and by a detection area of the measuring instrument at a second end.

7. The measuring system according to claim 6, wherein a movement space for the movement of the seal diaphragm is adjacent to the first end of the transmission channel facing the seal diaphragm.

8. The measuring system according to claim 7, wherein the transmission channel and the movement space are filled with a diaphragm seal fluid.

9. The measuring system according to claim 5, wherein the seal diaphragm and the adapter diaphragm have a congruent, corrugated cross section.

10. The measuring system according to claim 5, wherein the adapter and/or the diaphragm seal have a vacuum port for evacuating an intermediate space formed between the adapter and the diaphragm seal in a mounted state.

11. The measuring system according to claim 10, wherein a measuring instrument for monitoring the vacuum evacuation of the intermediate space is coupled with the vacuum port.

12. The measuring system according to claim 10, wherein a valve is coupled with the vacuum port.

13. The measuring system according to claim 5, wherein an outer diameter of the cylindrical section of the diaphragm seal, and an inner diameter of the cylindrical section of the adapter are designed such that the diaphragm seal is movable within the adapter without a noticeable clearance.

14. The measuring system according to claim 5, wherein, for fastening the diaphragm seal on the adapter, the adapter has a female thread or a male thread, and the diaphragm seal has a male thread or a female thread corresponding thereto, wherein the adapter and the diaphragm seal include fastening structures for fastening at least one clamp or a clamping ring and/or corresponding bores and/or threads for a screw connection.

15. The measuring system according to claim 5, wherein the adapter and/or the diaphragm seal have an outer diameter of 30 mm to 80 mm.

16. The measuring system according to claim 5, wherein the adapter and/or the diaphragm seal have an outer diameter of 40 mm to 70 mm.

17. An apparatus comprising:
a process chamber in which a process medium is present;
a process port coupled with the process chamber; and
a measuring system according to claim 5 coupled with the process port.

18. The apparatus according to claim 17, wherein the adapter diaphragm is disposed in alignment with an upper wall delimiting the process chamber.

* * * * *